United States Patent
Yang et al.

(10) Patent No.: US 12,532,311 B2
(45) Date of Patent: Jan. 20, 2026

(54) SOUNDING REFERENCE SIGNAL RESOURCE DETERMINATION FOR PHYSICAL UPLINK SHARED CHANNEL WITH CONFIGURED GRANT

(71) Applicant: QUALCOMM Incorporated, San Diego, CA (US)

(72) Inventors: Wei Yang, San Diego, CA (US); Alexandros Manolakos, Escondido, CA (US); Chenxi Hao, Beijing (CN); Yi Huang, San Diego, CA (US); Peter Gaal, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 17/593,764

(22) PCT Filed: Mar. 31, 2020

(86) PCT No.: PCT/CN2020/082238
§ 371 (c)(1),
(2) Date: Sep. 24, 2021

(87) PCT Pub. No.: WO2020/207289
PCT Pub. Date: Oct. 15, 2020

(65) Prior Publication Data
US 2022/0232589 A1  Jul. 21, 2022

(30) Foreign Application Priority Data
Apr. 9, 2019 (WO) ................ PCT/CN2019/081872

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0051* (2013.01); *H04W 72/20* (2023.01); *H04W 72/23* (2023.01)

(58) Field of Classification Search
CPC . H04W 72/1268; H04W 72/20; H04W 72/23; H04L 5/0051
(Continued)

(56) References Cited

U.S. PATENT DOCUMENTS

2014/0301297 A1* 10/2014 Geirhofer ............. H04L 5/0053
370/329
2019/0075589 A1  3/2019 Jeon et al.
(Continued)

FOREIGN PATENT DOCUMENTS

CN  102469601 A  5/2012
JP  2015015742 A  1/2015
(Continued)

OTHER PUBLICATIONS

International Search Report and Written Opinion—PCT/CN2020/082238—ISAEPO—Jun. 19, 2020.
(Continued)

*Primary Examiner* — Chi Tang P Cheng
(74) *Attorney, Agent, or Firm* — Harrity & Harrity, LLP

(57) ABSTRACT

Various aspects of the present disclosure generally relate to wireless communication. In some aspects, a user equipment (UE) may identify a first sounding reference signal (SRS) transmission that occurred most recently in time, relative to a second SRS transmission, prior to transmission of one or more physical uplink shared channel (PUSCH) communications. The one or more PUSCH communications may correspond to a configured grant. The UE may transmit the one or more PUSCH communications using one or more
(Continued)

SRS resources associated with the first SRS transmission. Numerous other aspects are provided.

26 Claims, 11 Drawing Sheets

(51) Int. Cl.
  *H04W 72/20* (2023.01)
  *H04W 72/23* (2023.01)

(58) Field of Classification Search
  USPC .......................................................... 370/329
  See application file for complete search history.

(56) References Cited

U.S. PATENT DOCUMENTS

| | | | | |
|---|---|---|---|---|
| 2019/0174466 | A1* | 6/2019 | Zhang | H04L 5/0057 |
| 2019/0261281 | A1* | 8/2019 | Jung | H04W 52/50 |
| 2021/0176096 | A1* | 6/2021 | Shimoda | H04L 5/0005 |
| 2022/0094415 | A1* | 3/2022 | Hakola | H04B 7/0691 |

FOREIGN PATENT DOCUMENTS

| | | | |
|---|---|---|---|
| KR | 20190029722 | A | 3/2019 |
| WO | 2012055259 | A1 | 5/2012 |
| WO | 2012088876 | A1 | 7/2012 |
| WO | 2012167589 | A1 | 12/2012 |
| WO | 2016164306 | A1 | 10/2016 |

OTHER PUBLICATIONS

International Search Report and Written Opinion—PCT/CN2019/081872—ISA/EPO—Jan. 6, 2020.

ZTE: "Discussion on SRS for Configured Grant PUSCH", 3GPP TSG RAN WG1 #96bis, R1-1904753, Xi'an, China, Apr. 8-12, 2019, Mar. 30, 2019, pp. 1-3.

Nokia Siemens Networks., et al., "UL Sounding", 3GPP TSG RAN WG1 Meeting #49, R1-072296, 3rd Generation Partnership Project, Mobile Competence Centre, 650, Route Des Lucioles, F-06921 Sophia-Antipolis Cedex, France, vol. RAN WG1, No. Kobe, Japan, May 7-11, 2007, May 2, 2007, May 2, 2007, XP050106026, p. 3, 5 Pages.

Supplementary European Search Report—EP20788407—Search Authority—The Hague—Jan. 3, 2023.

ZTE et al: "Discussion on SRS design for NR", 3GPP TSG RAN WG1 Meeting NR#3, R1-1715451, Discussion on SRS Design for NR, 3rd Generation Partnership Project, Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 12, 2017, XP051329380, pp. 1-7, p. 6.

Taiwan Search Report—TW109111217—TIPO—Apr. 19, 2023.

ZTE: "Draft CR on Time Domain Behavior of SRS for Configured Grant PUSCH", R1-1904754, 3GPP TSG RAN WG1 Meeting #96bis, Xi'an, China, Apr. 8-12, 2019, 4 Pages.

Taiwan Search Report—TW109111217—TIPO—Nov. 29, 2023.

CATT: "Enhancements on multi-beam operation", 3GPP TSG RAN WG1 Ad-Hoc Meeting 1901, R1-1900340, Taipei, Jan. 21-25, 2019, 8 pages.

Intel Corporation: "On Beam Management Enhancement", 3GPP TSG RAN WG1 Ad-Hoc Meeting 1901, R1-1900503, Taipei, Jan. 21-25, 2019, pp. 1-14.

* cited by examiner

SOUNDING REFERENCE SIGNAL RESOURCE DETERMINATION FOR PHYSICAL UPLINK SHARED CHANNEL WITH CONFIGURED GRANT

CROSS-REFERENCE TO RELATED APPLICATIONS

This application is a 371 national stage of PCT Application No. PCT/CN2020/082238 filed on Mar. 31, 2020, entitled "SOUNDING REFERENCE SIGNAL RESOURCE DETERMINATION FOR PHYSICAL UPLINK SHARED CHANNEL WITH CONFIGURED GRANT," which claims priority to International Patent Application No. PCT/CN2019/081872, filed on Apr. 9, 2019, entitled "SOUNDING REFERENCE SIGNAL RESOURCE DETERMINATION FOR PHYSICAL UPLINK SHARED CHANNEL WITH CONFIGURED GRANT," which are hereby expressly incorporated by reference herein.

FIELD OF THE DISCLOSURE

Aspects of the present disclosure generally relate to wireless communication, and more particularly to techniques and apparatuses for sounding reference signal (SRS) resource determination for physical uplink shared channel (PUSCH) with configured grant.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying a first sounding reference signal (SRS) transmission that occurred most recently in time, relative to a second SRS transmission, prior to transmission of one or more physical uplink shared channel (PUSCH) communications, wherein the one or more PUSCH communications correspond to a configured grant; and transmitting the one or more PUSCH communications using one or more SRS resources associated with the first SRS transmission.

In some aspects, a UE for wireless communication may include memory and one or more processors operatively coupled to the memory. The memory and the one or more processors may be configured to identify a first SRS transmission that occurred most recently in time, relative to a second SRS transmission, prior to transmission of one or more PUSCH communications, wherein the one or more PUSCH communications correspond to a configured grant; and transmit the one or more PUSCH communications using one or more SRS resources associated with the first SRS transmission.

In some aspects, a non-transitory computer-readable medium may store one or more instructions for wireless communication. The one or more instructions, when executed by one or more processors of a UE, may cause the one or more processors to identify a first SRS transmission that occurred most recently in time, relative to a second SRS transmission, prior to transmission of one or more PUSCH communications, wherein the one or more PUSCH communications correspond to a configured grant; and transmit the one or more PUSCH communications using one or more SRS resources associated with the first SRS transmission.

In some aspects, an apparatus for wireless communication may include means for identifying a first SRS transmission that occurred most recently in time, relative to a second SRS transmission, prior to transmission of one or more PUSCH communications, wherein the one or more PUSCH communications correspond to a configured grant; and means for transmitting the one or more PUSCH communications using one or more SRS resources associated with the first SRS transmission.

In some aspects, a method of wireless communication, performed by a UE, may include identifying a first SRS transmission that occurred prior to reception of an activation downlink control information (DCI), and transmission of one or more first PUSCH communications, wherein the one or more first PUSCH communications correspond to a configured grant; transmitting the one or more first PUSCH communications using one or more first SRS resources associated with the first SRS transmission; identifying a second SRS transmission that occurred after reception of the activation DCI, and most recently in time, relative to one or more third SRS transmissions, prior to transmission of one or more second PUSCH communications, wherein the one or more second PUSCH communications correspond to the configured grant; and transmitting the one or more second PUSCH communications using one or more second SRS resources associated with the second SRS transmission.

In some aspects, a UE for wireless communication may include memory and one or more processors operatively coupled to the memory. The memory and the one or more processors may be configured to identify a first SRS transmission that occurred prior to reception of an activation DCI, and transmission of one or more first PUSCH communications, wherein the one or more first PUSCH communications correspond to a configured grant; transmit the one or more first PUSCH communications using one or more first SRS resources associated with the first SRS transmission; identify a second SRS transmission that occurred after reception of the activation DCI, and most recently in time, relative to one or more third SRS transmissions, prior to transmission of one or more second PUSCH communications, wherein the one or more second PUSCH communications correspond to the configured grant; and transmit the one or more second PUSCH communications using one or more second SRS resources associated with the second SRS transmission.

In some aspects, a non-transitory computer-readable medium may store one or more instructions for wireless communication. The one or more instructions, when executed by one or more processors of a UE, may cause the one or more processors to identify a first SRS transmission that occurred prior to reception of an activation DCI, and transmission of one or more first PUSCH communications, wherein the one or more first PUSCH communications correspond to a configured grant; transmit the one or more first PUSCH communications using one or more first SRS resources associated with the first SRS transmission; identify a second SRS transmission that occurred after reception of the activation DCI, and most recently in time, relative to one or more third SRS transmissions, prior to transmission of one or more second PUSCH communications, wherein the one or more second PUSCH communications correspond to the configured grant; and transmit the one or more second PUSCH communications using one or more second SRS resources associated with the second SRS transmission.

In some aspects, an apparatus for wireless communication may include means for identifying a first SRS transmission that occurred prior to reception of an activation DCI, and transmission of one or more first PUSCH communications, wherein the one or more first PUSCH communications correspond to a configured grant; means for transmitting the one or more first PUSCH communications using one or more first SRS resources associated with the first SRS transmission; means for identifying a second SRS transmission that occurred after reception of the activation DCI, and most recently in time, relative to one or more third SRS transmissions, prior to transmission of one or more second PUSCH communications, wherein the one or more second PUSCH communications correspond to the configured grant; and means for transmitting the one or more second PUSCH communications using one or more second SRS resources associated with the second SRS transmission.

In some aspects, a method of wireless communication, performed by a UE, may include identifying a first SRS transmission that occurred most recently in time, relative to a second SRS transmission, prior to transmission of one or more PUSCH communications, and at least a quantity of symbols prior to the transmission of the one or more PUSCH communications, wherein the one or more PUSCH communications correspond to a configured grant; and transmitting the one or more PUSCH communications using one or more SRS resources associated with the first SRS transmission.

In some aspects, a UE for wireless communication may include memory and one or more processors operatively coupled to the memory. The memory and the one or more processors may be configured to identify a first SRS transmission that occurred most recently in time, relative to a second SRS transmission, prior to transmission of one or more PUSCH communications, and at least a quantity of symbols prior to the transmission of the one or more PUSCH communications, wherein the one or more PUSCH communications correspond to a configured grant; and transmit the one or more PUSCH communications using one or more SRS resources associated with the first SRS transmission.

In some aspects, a non-transitory computer-readable medium may store one or more instructions for wireless communication. The one or more instructions, when executed by one or more processors of a UE, may cause the one or more processors to identify a first SRS transmission that occurred: most recently in time, relative to a second SRS transmission, prior to transmission of one or more PUSCH communications, and at least a quantity of symbols prior to the transmission of the one or more PUSCH communications, wherein the one or more PUSCH communications correspond to a configured grant; and transmit the one or more PUSCH communications using one or more SRS resources associated with the first SRS transmission.

In some aspects, an apparatus for wireless communication may include means for identifying a first SRS transmission that occurred most recently in time, relative to a second SRS transmission, prior to transmission of one or more PUSCH communications, and at least a quantity of symbols prior to the transmission of the one or more PUSCH communications, wherein the one or more PUSCH communications correspond to a configured grant; and means for transmitting the one or more PUSCH communications using one or more SRS resources associated with the first SRS transmission.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
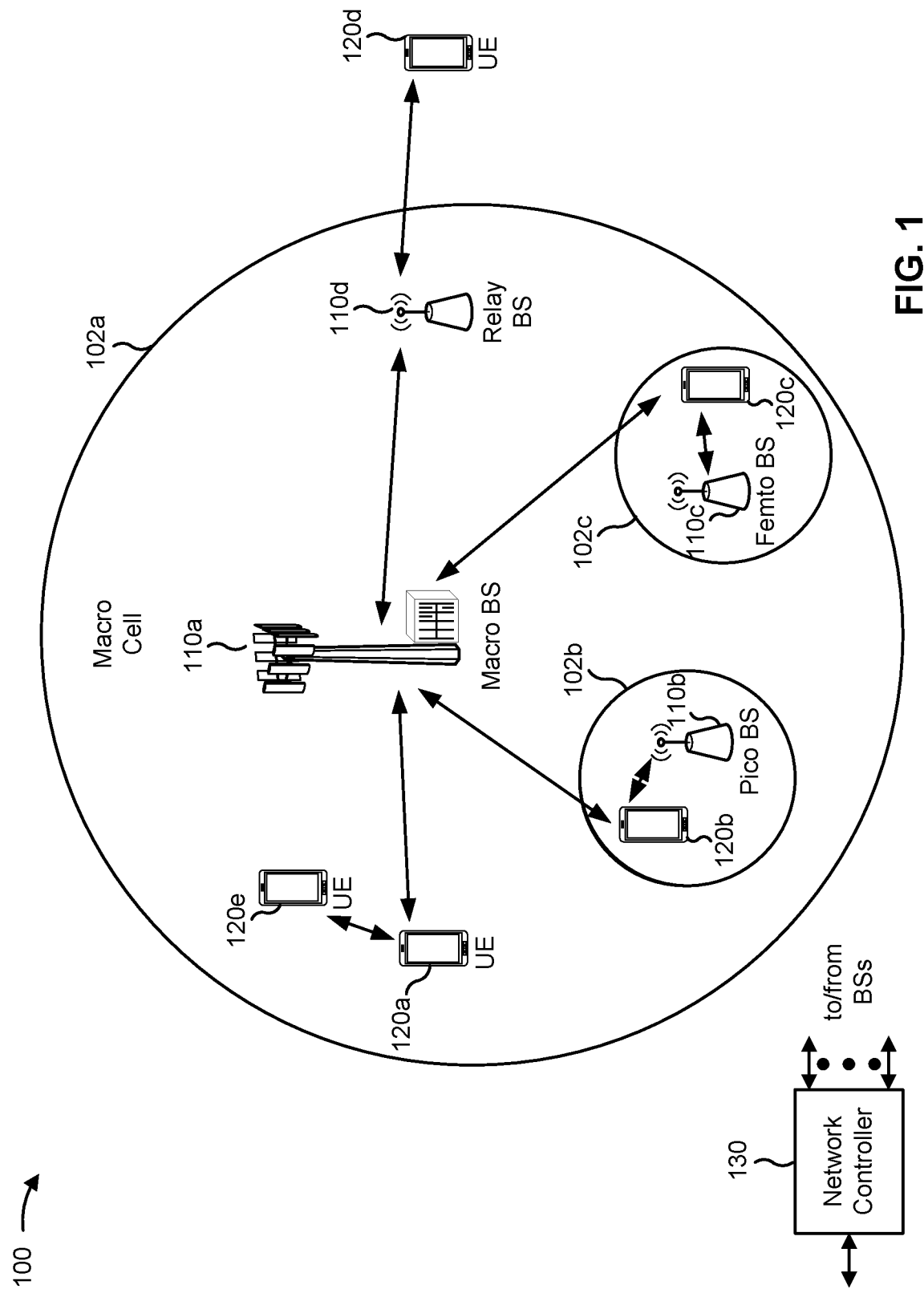
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
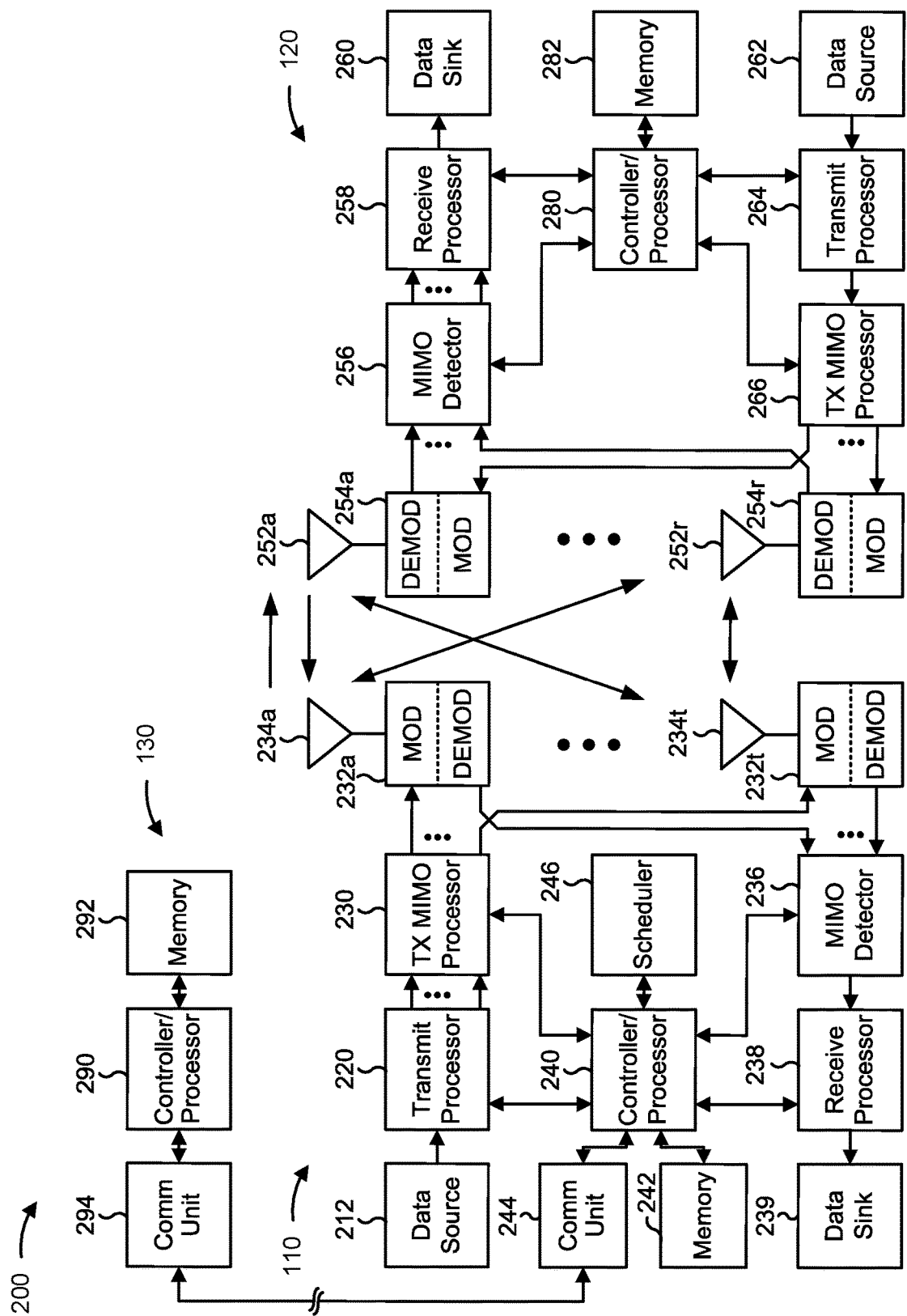
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sounding reference signal (SRS) resource determination for physical uplink shared channel (PUSCH) with configured grant, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for identifying a first SRS transmission that occurred most recently in time, relative to a second SRS transmission, prior to transmission of one or more PUSCH communications, wherein the one or more PUSCH communications correspond to a configured grant, means for transmitting the one or more PUSCH communications using one or more SRS resources associated with the first SRS transmission, and/or the like. In some aspects, UE 120 may include means for identifying a first SRS transmission that occurred prior to reception of an activation downlink control information (DCI) and transmission of one or more first PUSCH communications, wherein the one or more first PUSCH communications correspond to a configured grant, means for transmitting the one or more first PUSCH communications using one or more first SRS resources associated with the first SRS transmission, means for identifying a second SRS transmission that occurred after reception of the activation DCI and most recently in time, relative to one or more third SRS transmissions, prior to transmission of one or more second PUSCH communications, wherein the one or more second PUSCH communications correspond to the configured grant, means for transmitting the one or more second PUSCH communications using one or more second SRS resources associated with the second SRS transmission, and/or the like. In some aspects, UE 120 may include means for identifying a first SRS transmission that occurred most recently in time, relative to a second SRS transmission, prior to transmission of one or more PUSCH communications and at least a quantity of symbols prior to the transmission of the one or more PUSCH communications, wherein the one or more PUSCH communications correspond to a configured grant, means for transmitting the one or more PUSCH communications using one or more SRS resources associated with the first SRS transmission, and/or the like. In some aspects, such means may include one or more components of UE 120 described in connection with FIG. 2.

As indicated above, FIG. 2 is provided as an example. Other examples may differ from what is described with regard to FIG. 2.

Figure 3A:
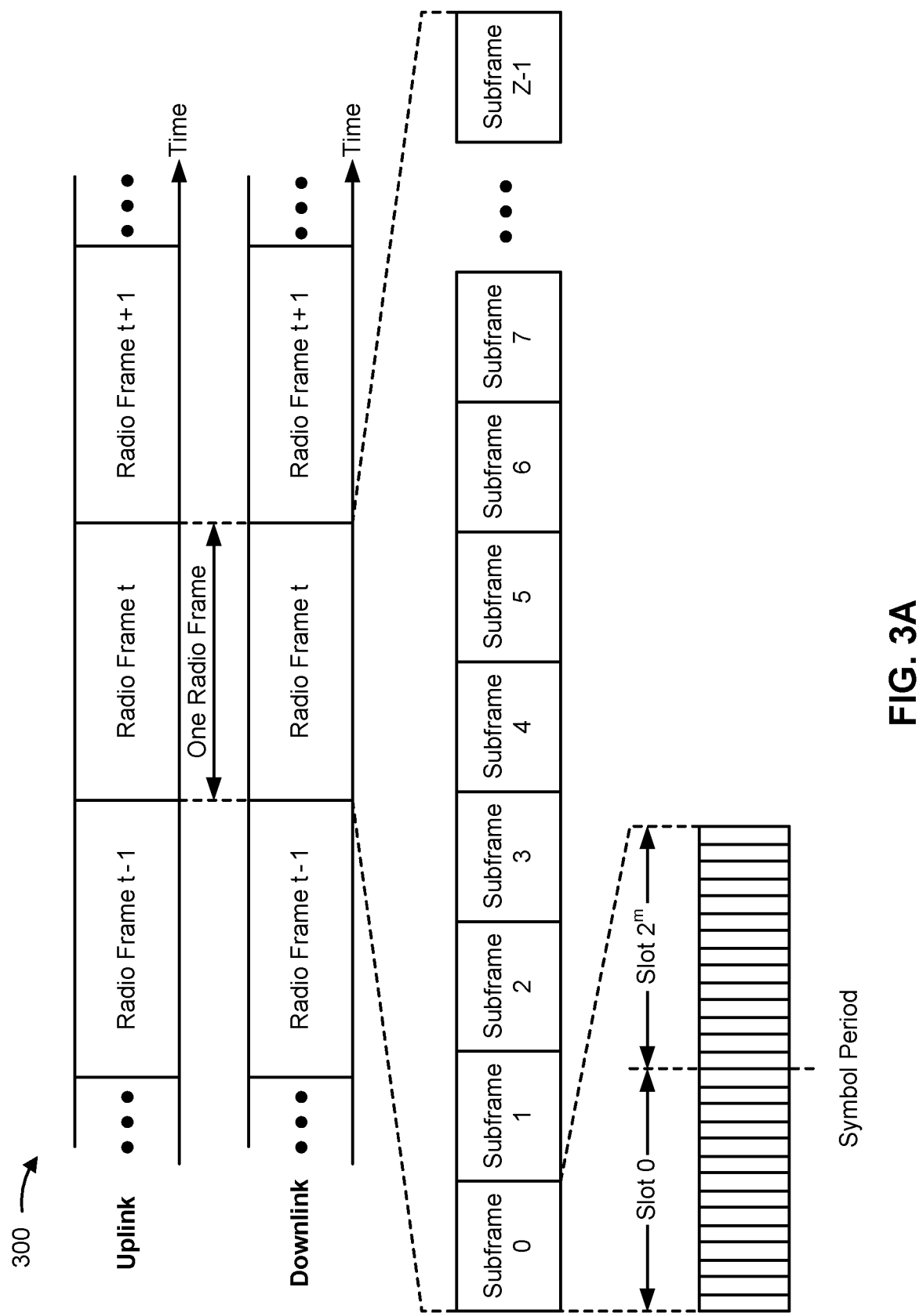
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z>1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
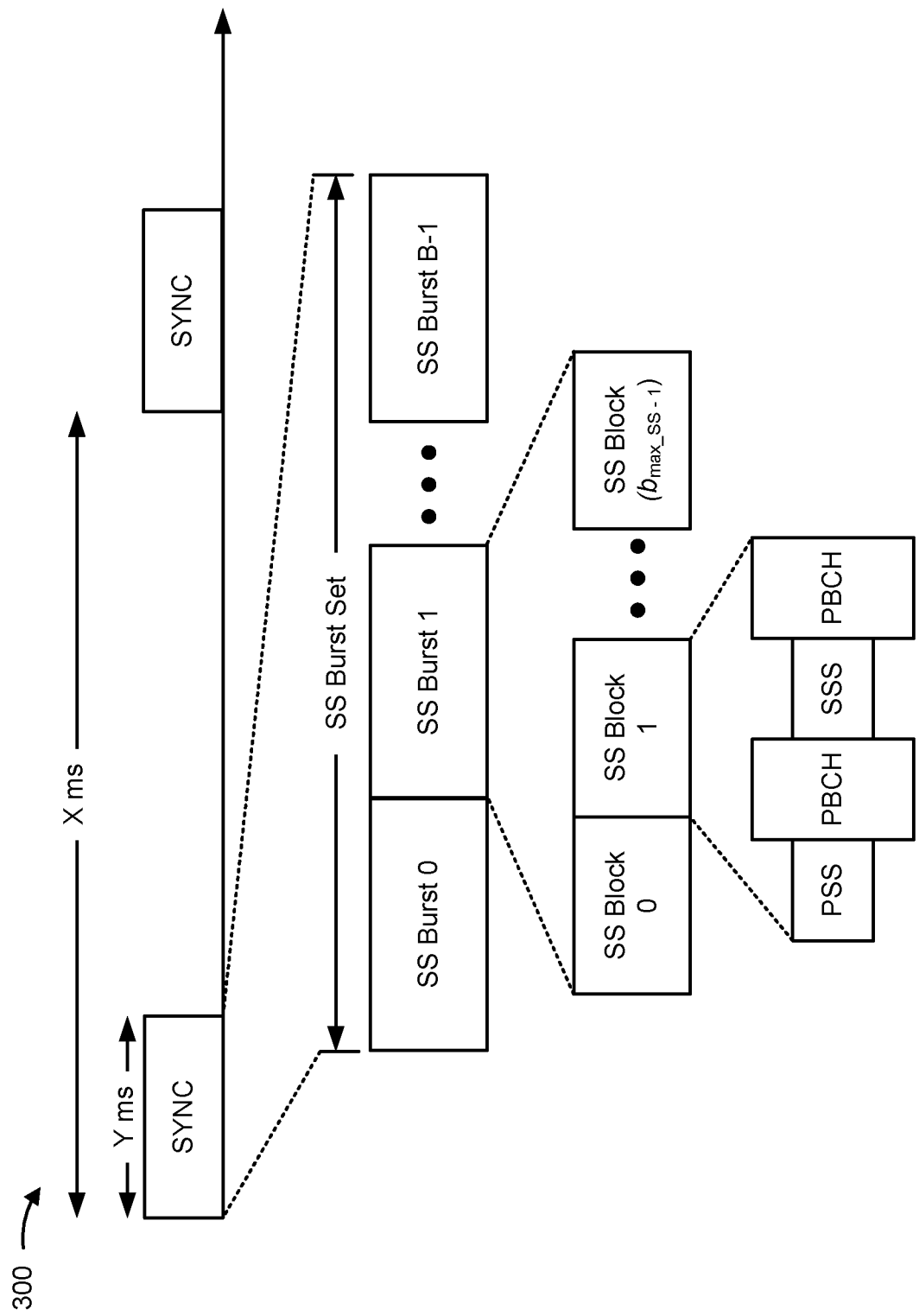
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBS) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
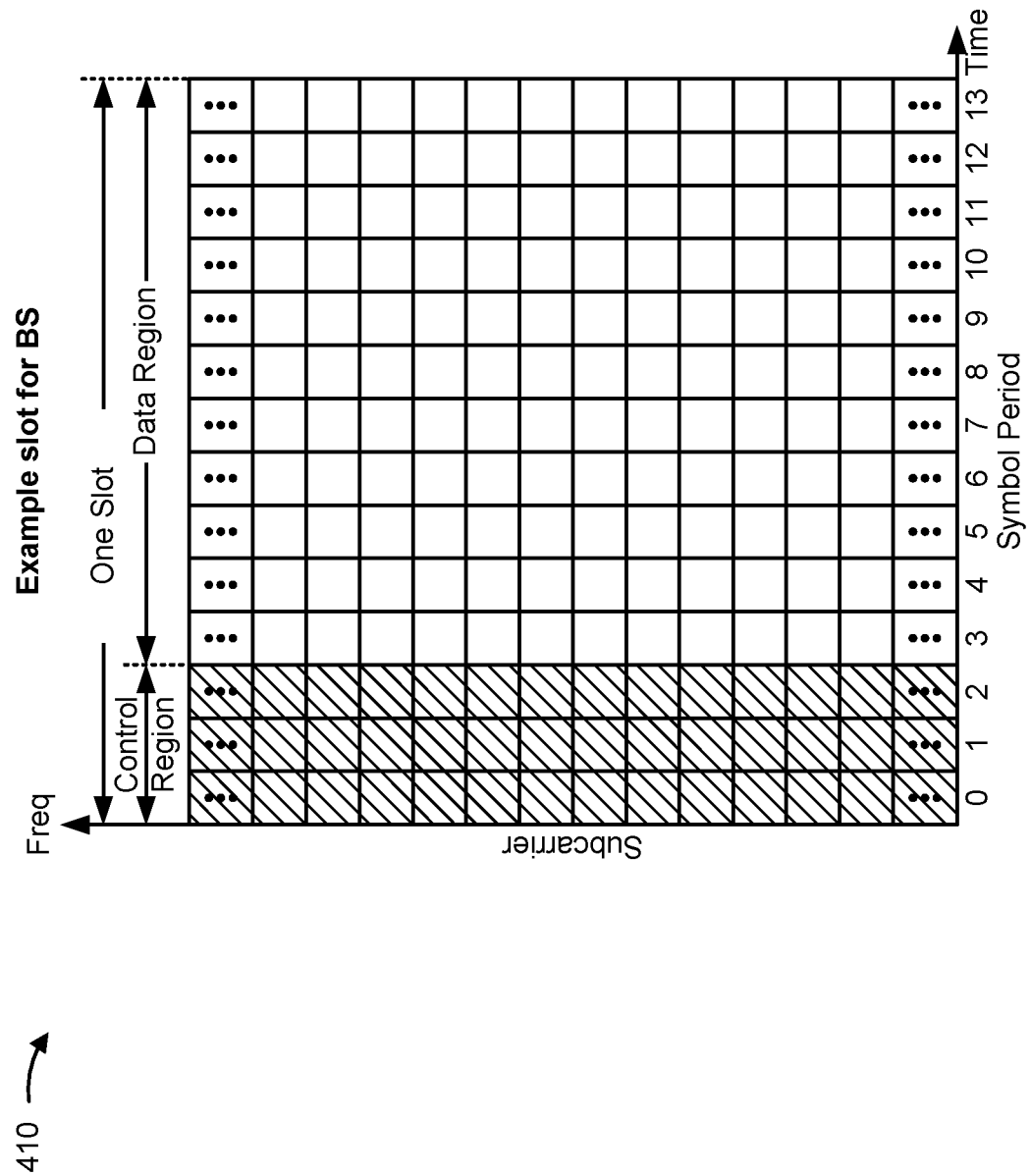
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q E $\{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

In a wireless network, a UE may transmit one or more SRSs to a BS. An SRS may be associated with one or more uplink time-frequency resources (e.g., one or more resource blocks, one or more symbols, and/or the like) referred to as SRS resources. The BS may perform one or more measurements of the SRS to estimate a channel quality of an associated one or more SRS resources. The BS may use the channel quality estimates to perform uplink scheduling for the UE, and the UE may transmit one or more PUSCH communications, to the BS, based at least in part on the uplink scheduling.

In some cases, the BS may dynamically configure an uplink grant for the transmission of one or more PUSCH communications. In these cases, the UE may transmit one or more SRSs to the BS, and the BS may indicate, in an SRS resource indicator (SRI) field in a dynamic grant communication (e.g., a downlink control information DCI and/or similar type of PDCCH communication), which SRS resources to use for the one or more PUSCH communications. The UE may transmit the one or more SRSs prior to receiving the dynamic grant.

In some cases, the BS may schedule the transmission of one or more PUSCH communications using semi-persistent scheduling. In these cases, the BS may transmit a configured grant to the UE, which the UE may use to transmit PUSCH communications for a plurality of slots. While semi-persistent scheduling reduces the signaling overhead of uplink scheduling, the UE may be unable to determine which SRS resources to use for PUSCH communications that are scheduled by a configured grant. This may occur because, for a configured grant, the UE may transmit one or more SRSs after receiving the configured grant. As a result, the UE may not receive a subsequent indication of which SRS resources, associated with the one or more SRSs, are to be used for the transmission of one or more PUSCH communications.

Some aspects, described herein, provide techniques and apparatuses for resource determination for PUSCH with configured grant. In some aspects, a BS may transmit a configured grant to a UE. The UE may transmit one or more SRSs and may identify one or more SRS resources, associated with the one or more SRSs, that are to be used to transmit one or more PUSCH communications. For example, a Type 1 configured grant (e.g., a configured grant that is configured and activated via radio resource control (RRC) signaling) may include an SRI field that indicates the UE is to use one or more SRS resources, associated with an SRS transmission that occurred most recently in time, relative to other SRS transmissions, prior to transmission of one or more PUSCH communications, for the transmission of the one or more PUSCH communications.

As another example, a Type 2 configured grant (e.g., a configured grant that is configured via RRC signaling and activated via an activation downlink control information (DCI)) may include an SRI field that indicates the UE is to use one or more first SRS resources, associated with a first SRS transmission that occurred prior to reception of the activation DCI and transmission of one or more first PUSCH communications, for the transmission of the one or more first PUSCH communications. The SRI field may further indicate that the UE is to use one or more second SRS resources, associated with a second SRS transmission that occurred after reception of the activation DCI and most recently in time, relative to other SRS transmissions, prior to transmission of one or more second PUSCH communications, for transmitting the one or more second PUSCH communications.

As another example, a configured grant (e.g., a Type 1 configured grant or a Type 2 configured grant) may include an SRI field that indicates the UE is to use one or more SRS resources, associated with an SRS transmission that occurred most recently in time, relative to other SRS transmissions, prior to transmission of one or more PUSCH communications and at least a quantity of symbols prior to the transmission of the one or more PUSCH communications, for the transmission of the one or more PUSCH communications.

In this way, the UE may use the techniques and aspects described herein to identify SRS resources for transmitting one or more PUSCH communications that are scheduled via various types of configured grants, which the UE was not previously capable of performing.

Figure 5:
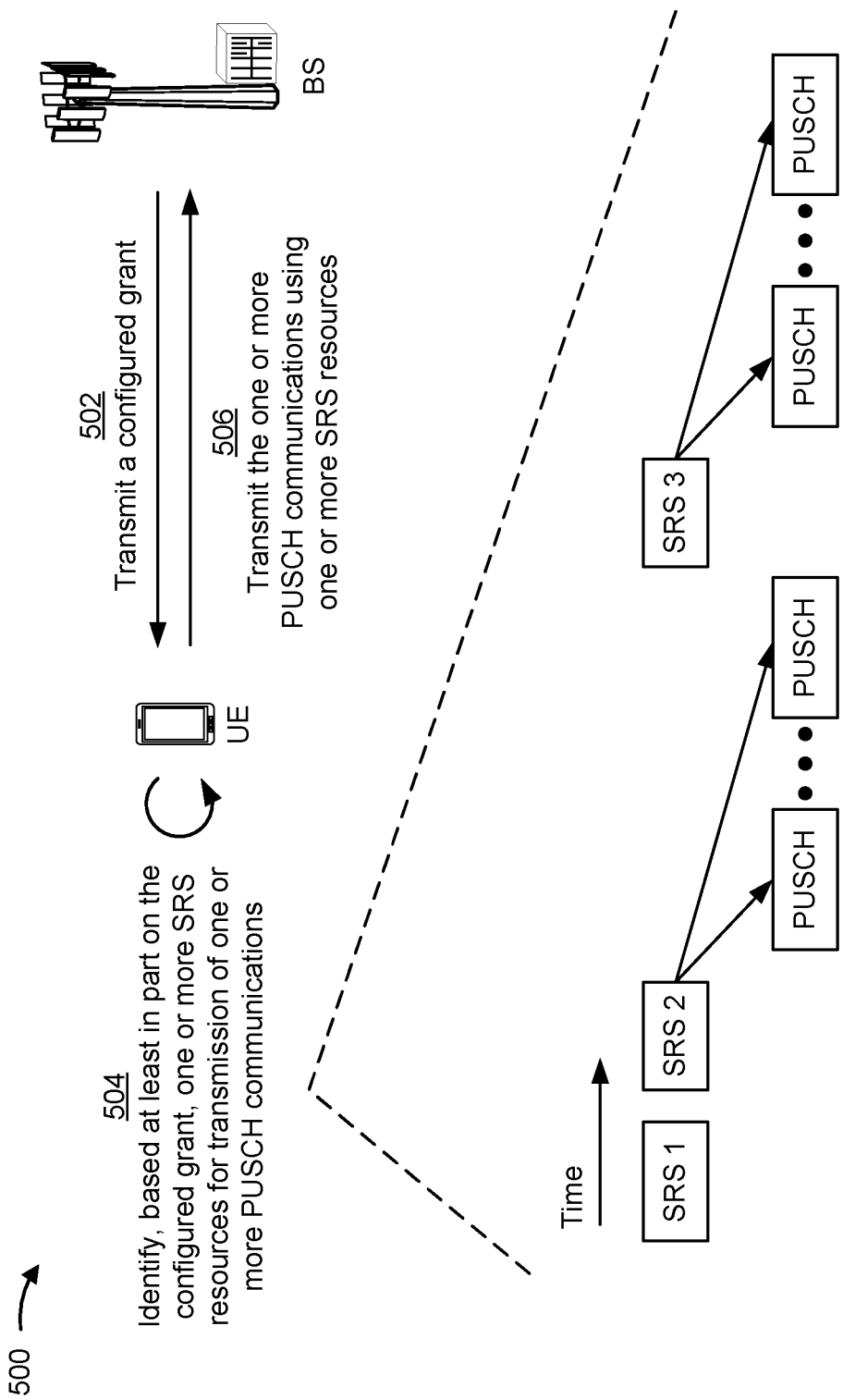
FIGS. 5-7 are diagrams illustrating examples of sounding reference signal (SRS) resource determination for physical uplink shared channel (PUSCH) with configured grant, in accordance with various aspects of the present disclosure.

FIG. 5 is a diagram illustrating an example 500 of SRS resource determination for PUSCH with configured grant, in accordance with various aspects of the present disclosure. As shown in FIG. 5, example 500 may include communications between a BS (e.g., BS 110) and a UE (e.g., UE 120). In some aspects, the BS may perform uplink scheduling for the UE. Uplink scheduling may include configuring uplink resources (e.g., time-frequency resources) for transmission of one or more PUSCH communications.

As shown in FIG. 5, and by reference number 502, the BS may perform uplink scheduling by scheduling the transmission of one or more PUSCH communications via a configured grant. The BS may transmit, to the UE, the configured grant in an RRC communication. In this case, the configured grant may include a Type 1 configured grant, which may be a configured grant that is configured and activated via RRC signaling in PDCCH.

The RRC communication may include one or more fields or information elements (IEs) that indicate which SRS resources (e.g., uplink time-frequency resources) the UE is to use to transmit one or more PUSCH communications that are configured by the configured grant. For example, the RRC communication may include an SRI field that indicates which SRS resources the UE is to use to transmit the one or more PUSCH communications. The SRI field may include an srs-ResourceIndicator IE and/or another type of IE. The SRI field may be included in another IE, such as an rrc-ConfiguredUplinkGrant IE and/or the like. The SRI field may indicate that the UE is to transmit PUSCH communications using one or more SRS resources that are associated with an SRS transmission that occurred most recently relative to when the PUSCH communications are to be transmitted.

As further shown in FIG. 5, and by reference number 504, the UE may receive the configured grant and may identify, based at least in part on the configured grant, one or more SRS resources for transmission of one or more PUSCH communications. For example, the UE may identify, based at least in part on the SRI field in the configured grant, an SRS transmission that occurred most recently in time, relative to other SRS transmissions by the UE, prior to transmission of the one or more PUSCH communications scheduled by the configured grant.

To illustrate an example of the above, the UE may transmit three SRSs in a particular time period (e.g., SRS 1, SRS 2, and SRS 3). The UE may transmit SRS 1 first, may transmit SRS 2 after SRS 1, and may transmit SRS 3 after SRS 2. The configured grant may schedule one or more PUSCHs to be transmitted between the transmission of SRS 2 and SRS 3. SRS 1 and SRS 2 were both transmitted prior to the transmission of the one or more PUSCHs. However, the transmission of SRS 2 occurred closest in time relative to the transmission of SRS 1, to the scheduled transmission of the one or more PUSCHs. Thus, the UE may identify that the transmission of SRS 2 is the SRS transmission that occurred most recently to the scheduled transmission of the one or more PUSCHs. Accordingly, the UE may identify the one or more SRS resources associated with SRS 2 as the SRS resources for transmitting the one or more PUSCH communications.

As an illustration of another example of the above, the configured grant may schedule one or more PUSCHs to be transmitted after the transmission of SRS 3. SRS 1, SRS 2, and SRS 3 were all transmitted prior to the transmission of the one or more PUSCHs. However, the transmission of SRS 3 occurred more recently, relative to the transmission of SRS 1 and SRS 2, to the scheduled transmission of the one or more PUSCHs. Thus, the UE may identify that the transmission of SRS 3 is the SRS transmission that occurred most recently to the scheduled transmission of the one or more PUSCHs. Accordingly, the UE may identify the one or more SRS resources associated with SRS 3 as the SRS resources for transmitting the one or more PUSCH communications.

In some aspects, the SRI field included in the configured grant, another RRC parameter field in the configured grant or another signaling communication, a table or specification, and/or the like, may further indicate that the UE is to use SRS resources associated with particular SRS types for the transmission of one or more PUSCH communications. For example, the SRI field included in the configured grant, another RRC parameter field in the configured grant or another signaling communication, a table or specification (e.g., hard-coded at the UE), and/or the like may indicate that the UE is to use SRS resources associated with periodic SRS transmissions, aperiodic SRS transmissions, and/or semi-persistent SRS transmissions. Accordingly, the UE may identify the SRS resources, that are to be used for the transmission of the one or more PUSCH communications, by identifying a most recent SRS transmission, of the specified one or more SRS types, to the scheduled transmission of the one or more PUSCH communications. In some aspects, the BS may semi-statically (e.g., via RRC signaling) configure the UE with an associated SRS resource set for one or more PUSCH communications scheduled by the configured grant. Thus, a configured grant PUSCH may be transmitted based on the particular configured SRS resource set. In some aspects, the BS may configure the UE to use a different SRS resource set for a dynamically scheduled PUSCH communication (e.g., by an activation DCI) relative to the SRS resource set configured by the RRC signaling.

To illustrate an example of the above, SRS 1 may include a semi-persistent SRS and SRS 2 may include an aperiodic SRS. If the SRI field included in the configured grant indicates that the UE is to use SRS resources associated with either semi-persistent SRS transmissions or periodic SRS transmissions, the UE may identify SRS 1 as the SRS transmission that occurred most recently in time prior to transmission of the one or more PUSCH communications between the transmission of SRS 2 and SRS 3 (e.g., since SRS 2 is not one of the indicated SRS types). Thus, the UE may use the SRS resources associated with SRS 1 to transmit the one or more PUSCH communications.

As further shown in FIG. 5, and by reference number 506, the UE may transmit the one or more PUSCH communications using the one or more SRS resources that were identified based at least in part on the configured grant. Thus, the UE may transmit the one or more PUSCH communications in the time-frequency resources corresponding to the one or more SRS resources. In some aspects, a quantity of SRS resources, associated with an SRS transmission, may be based at least in part on whether the one or more PUSCH communications are codebook-based PUSCH transmissions or non-codebook-based PUSCH communications. For example, the UE may use one SRS resource to transmit codebook-based PUSCH communications. As another example, the UE may use a plurality of SRS resources to transmit non-codebook-based PUSCH communications.

In this way, the BS may transmit a configured grant that may include an SRI field that indicates the UE is to use one or more SRS resources, associated with an SRS transmission that occurred most recently in time, relative to other SRS transmissions, prior to transmission of one or more PUSCH communications, for the transmission of the one or more PUSCH communications. This permits the UE to identify SRS resources for transmitting one or more PUSCH communications that are scheduled via a configured grant, which the UE was not previously capable of performing.

As indicated above, FIG. 5 is provided as an example. Other examples may differ from what is described with respect to FIG. 5.

Figure 6:
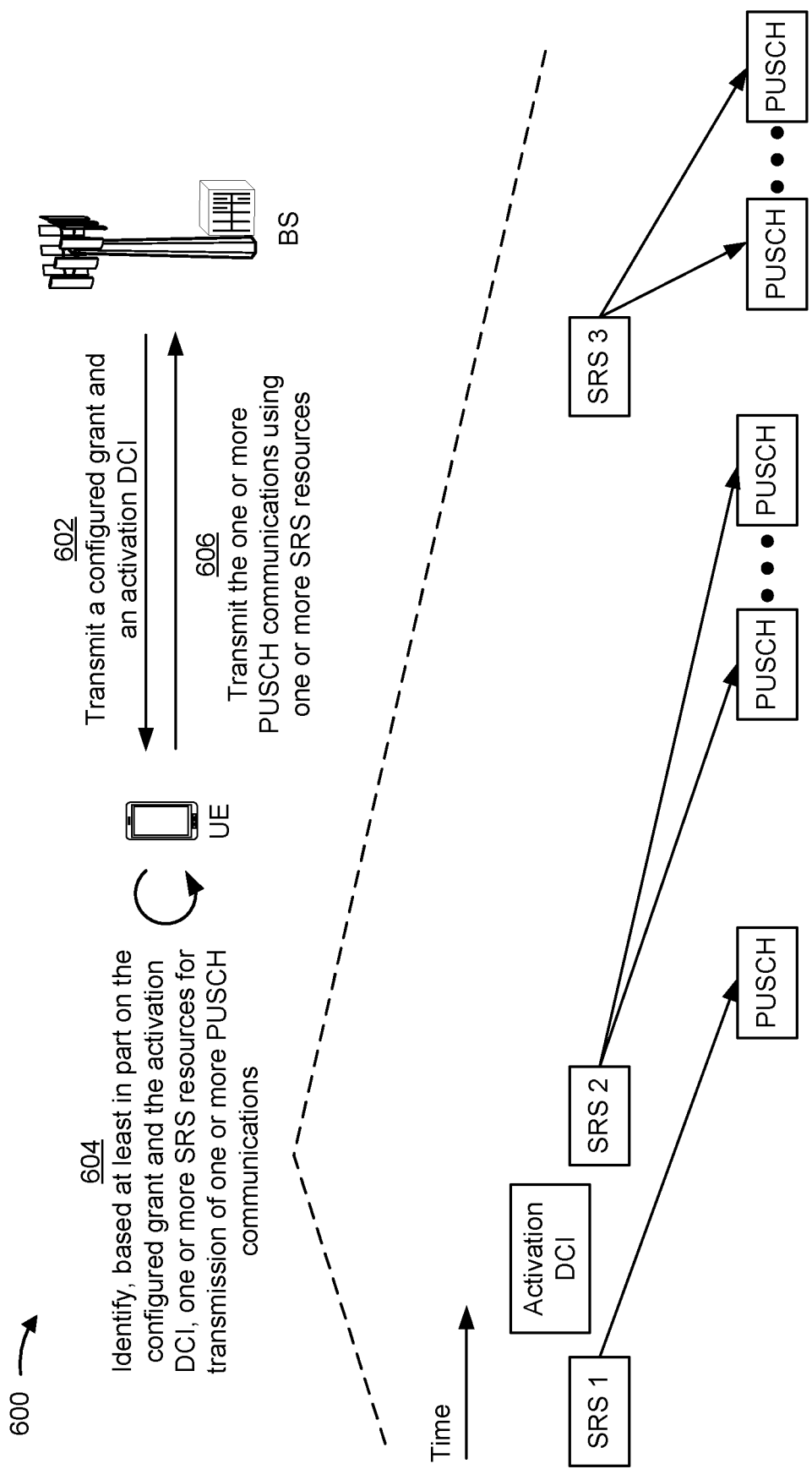

FIG. 6 is a diagram illustrating an example 600 of SRS resource determination for PUSCH with configured grant, in accordance with various aspects of the present disclosure. As shown in FIG. 6, example 600 may include communications between a BS (e.g., BS 110) and a UE (e.g., UE 120). In some aspects, the BS may perform uplink scheduling for the UE. Uplink scheduling may include configuring uplink resources (e.g., time-frequency resources) for transmission of one or more PUSCH communications.

As shown in FIG. 6, and by reference number 602, the BS may perform uplink scheduling by scheduling the transmission of one or more PUSCH communications via a configured grant and an activation DCI. The BS may transmit, to the UE, the configured grant in an RRC communication and the activation DCI in a DCI communication. In this case, the configured grant may include a Type 2 configured grant, which may be a configured grant that is configured via RRC signaling and activated via an activation DCI in PDCCH.

In some aspects, the RRC communication and/or the activation DCI may include one or more fields or IEs that indicate which SRS resources the UE is to use to transmit one or more PUSCH communications that are configured by the configured grant. For example, the RRC communication and/or the activation DCI may include an SRI field that indicates which SRS resources the UE is to use to transmit the one or more PUSCH communications. The SRI field may be included in the activation DCI. The SRI field may include an srs-ResourceIndicator IE and/or another type of IE. The SRI field may be included in another IE, such as an rrc-ConfiguredUplinkGrant IE and/or the like.

The SRI field included in the configured grant, another RRC parameter field in the configured grant or another signaling communication, a table or specification (e.g., hard-coded at the UE), and/or the like may indicate that the UE is to transmit a particular quantity of PUSCH communications using one or more first SRS resources that are associated with a first SRS transmission that occurred prior to reception of the activation DCI and prior to transmission of the one or more first PUSCH communications (e.g., one PUSCH communication or a plurality of PUSCH communications). In some aspects, the UE may implicitly derive the quantity of PUSCH communications based at least in part on the periodicity of the PUSCH transmission (e.g., for all PUSCH transmissions that fall within the same slot, or a same time duration as the first PUSCH). The SRI field included in the configured grant, another RRC parameter field in the configured grant or another signaling communication, a table or specification (e.g., hard-coded at the UE), and/or the like may further indicate that the UE is to use, for transmission of PUSCH communications scheduled after the particular quantity of PUSCH communications, SRS resources that are associated with SRS transmissions that occurred after reception of the activation DCI and most recently relative to when the PUSCH communications are to be transmitted.

As further shown in FIG. 6, and by reference number 604, the UE may receive the configured grant and the activation DCI, and may identify, based at least in part on the configured grant and the activation DCI, one or more SRS resources for transmission of one or more PUSCH communications. For example, the UE may identify a first SRS transmission that occurred prior to reception of the DCI and prior to transmission of one or more first PUSCH communications scheduled by the configured grant and/or activation DCI, may identify a second SRS transmission that occurred after reception of the activation DCI and most recently in time, relative to other SRS transmissions, prior to transmission of one or more second PUSCH communications scheduled by the configured grant and/or activation DCI. In some aspects, the UE may continue to identify SRS resources, for subsequent transmissions of PUSCH communications scheduled by the configured grant and/or activation DCI, by identifying SRS transmissions that occurred after reception of the activation DCI and most recently in time, relative to other SRS transmissions, prior to transmission of the subsequent PUSCH communications.

To illustrate an example of the above, the UE may transmit three SRSs in a particular time period (e.g., SRS 1, SRS 2, and SRS 3). The UE may transmit SRS 1 first, may transmit SRS 2 after SRS 1, and may transmit SRS 3 after SRS 2. The configured grant and/or activation DCI may schedule one or more PUSCHs to be transmitted between the transmission of SRS 2 and SRS 3. SRS 1 and SRS 2 were both transmitted prior to the transmission of the one or more PUSCHs. The transmission of SRS 1 occurred prior to reception of the activation DCI, and the transmission of SRS 2 occurred after the reception of the activation DCI. Since the transmission of SRS 1 occurred prior to reception of the activation DCI (e.g., the transmission of SRS 1 may be the most recent SRS transmission prior to reception of the activation DCI), the UE may identify the SRS resources associated with SRS 1, and may use the SRS resources to transmit a particular quantity of PUSCH communications that are scheduled to be transmitted after the reception of the activation DCI.

Moreover, any remaining PUSCH communications, that are scheduled to be transmitted between the transmission of SRS 2 and SRS 3 and that were not transmitted using the SRS resources associated with SRS 1, may be transmitted using the SRS resources associated with SRS 2. This is because the transmission of SRS 2 occurred after reception of the activation DCI and is the most recent SRS transmission prior to the scheduled transmission of the remaining PUSCH communications between SRS 2 and SRS 3.

The UE may continue to transmit PUSCH communications, after reception of the activation DCI, using SRS resources associated with SRS transmissions that occurred most recently to the scheduled transmission of the PUSCH communications. For example, the UE may use SRS resources, associated with SRS 3, for the transmission of one or more PUSCH communications that are scheduled to be transmitted most recently after the transmission of SRS 3 and prior the transmission of another SRS.

In some aspects, the SRI field included in the configured grant, another RRC parameter field in the configured grant or another signaling communication, a table or specification (e.g., hard-coded at the UE), and/or the like may indicate that the UE is to use SRS resources associated with particular SRS types for the transmission of one or more PUSCH communications. For example, the SRI field may indicate that the UE is to use SRS resources associated with periodic SRS transmissions, aperiodic SRS transmissions, and/or semi-persistent SRS transmissions. Accordingly, the UE may identify one or more first SRS resources, that are to be used for transmission of one or more first PUSCH communications, by identifying a first SRS transmission, of one or more first specified SRS types, that occurred prior to reception of the activation DCI and prior to transmission of the one or more first PUSCH communications, may identify one or more second SRS resources, that are to be used for transmission of one or more second PUSCH communications, by identifying a second SRS transmission, of one or more second specified SRS types, that occurred after reception of the activation DCI and most recently prior to transmission of the one or more second PUSCH communications, and so on.

As further shown in FIG. 6, and by reference number 606, the UE may transmit the one or more PUSCH communications using the one or more SRS resources that were identified based at least in part on the configured grant and the activation DCI. Thus, the UE may transmit the one or more PUSCH communications in the time-frequency resources corresponding to the one or more SRS resources. For example, the UE may use one SRS resource to transmit codebook-based PUSCH communications. As another example, the UE may use a plurality of SRS resources to transmit non-codebook-based PUSCH communications.

In this way, the BS may transmit a configured grant and/or activation DCI that indicates the UE is to use one or more first SRS resources, associated with a first SRS transmission that occurred prior to reception of the activation DCI and transmission of one or more first PUSCH communications, for the transmission of the one or more first PUSCH communications. The configured grant and/or activation DCI may further indicate that the UE is to use one or more second SRS resources, associated with a second SRS transmission that occurred after reception of the activation DCI and most recently in time, relative to other SRS transmissions, prior to transmission of one or more second PUSCH communications, for transmitting the one or more second PUSCH communications. This permits the UE to identify SRS resources for transmitting one or more PUSCH communications that are scheduled via a configured grant and/or activation DCI, which the UE was not previously capable of performing.

As indicated above, FIG. 6 is provided as an example. Other examples may differ from what is described with respect to FIG. 6.

Figure 7:
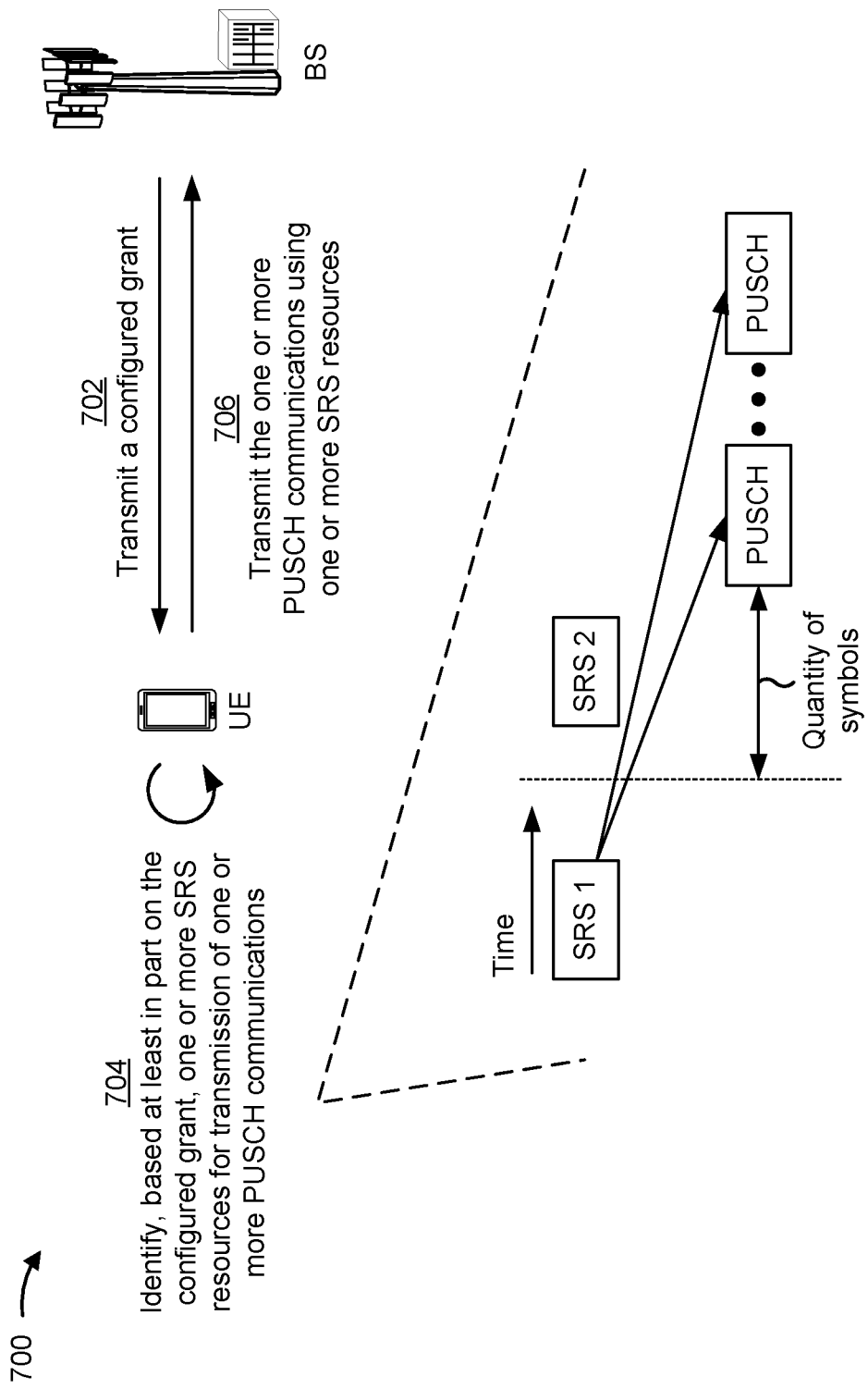

FIG. 7 is a diagram illustrating an example 700 of SRS resource determination for PUSCH with configured grant, in accordance with various aspects of the present disclosure. As shown in FIG. 7, example 700 may include communications between a BS (e.g., BS 110) and a UE (e.g., UE 120). In some aspects, the BS may perform uplink scheduling for the UE. Uplink scheduling may include configuring uplink resources (e.g., time-frequency resources) for transmission of one or more PUSCH communications.

As shown in FIG. 7, and by reference number 702, the BS may perform uplink scheduling by scheduling the transmission of one or more PUSCH communications via a configured grant. The BS may transmit, to the UE, the configured grant in an RRC communication. The configured grant may include a Type 1 configured grant (e.g., a configured grant that is configured and activated via RRC signaling in PDCCH) or a Type 2 configured grant (e.g., a configured grant that is configured via RRC signaling in PDCCH and activated via an activation DCI in PDCCH).

The RRC communication may include one or more fields or IEs that indicate which SRS resources (e.g., uplink time-frequency resources) the UE is to use to transmit one or more PUSCH communications that are configured by the configured grant. For example, the RRC communication may include an SRI field that indicates which SRS resources the UE is to use to transmit the one or more PUSCH communications. The SRI field may include an srs-ResourceIndicator IE and/or another type of IE. The SRI field may be included in another IE, such as an rrc-ConfiguredUplinkGrant IE and/or the like. The SRI field may indicate that the UE is to transmit PUSCH communications using one or more SRS resources that are associated with an SRS transmission that occurred most recently relative to when the PUSCH communications are to be transmitted and that occurred at least a quantity of symbols (e.g., three symbols, five symbols, and/or the like) prior to when the PUSCH communications are to be transmitted.

As further shown in FIG. 7, and by reference number 704, the UE may receive the configured grant and may identify, based at least in part on the configured grant, one or more SRS resources for transmission of one or more PUSCH communications. For example, the UE may identify an SRS transmission that occurred most recently in time, relative to other SRS transmissions by the UE, prior to the transmission of one or more PUSCH communications scheduled by the configured grant, and that occurred at least a quantity of symbols prior to the transmission of the one or more PUSCH communications.

To illustrate an example of the above, the UE may transmit two SRSs in a particular time period (e.g., SRS 1 and SRS 2). The UE may transmit SRS 1 first and may transmit SRS 2 after SRS 1. The configured grant may schedule one or more PUSCHs to be transmitted after the transmission of SRS 1 and SRS 2. However, the transmission of SRS 2 did not occur at least the quantity of symbols, indicated in the configured grant, prior to the scheduled transmission of the one or more PUSCHs. Thus, the UE may identify the transmission of SRS 1 as the SRS transmission that occurred most recently to the scheduled transmission of the one or more PUSCHs, and that occurred at least the quantity of symbols prior to the scheduled transmission of the one or more PUSCHs. Accordingly, the UE may identify the one or more SRS resources associated with SRS 1 as the SRS resources for transmitting the one or more PUSCH communications.

In some aspects, the quantity of symbols may be different for different PUSCH communications. For example, the quantity of symbols associated with a first PUSCH communication after SRS 2 may be different form a quantity of symbols associated with a second PUSCH communication after SRS 2. In this case, the UE may determine, for each PUSCH communication, which SRS transmission (and corresponding SRS resources) are to be used for the transmission of the PUSCH communication. In some aspects, the quantity of symbols may be N2, which may be the minimum processing time required for the UE to prepare the PUSCH communication after receiving an uplink grant.

In some aspects, The SRI field included in the configured grant, another RRC parameter field in the configured grant or another signaling communication, a table or specification (e.g., hard-coded at the UE), and/or the like may further indicate that the UE is to use SRS resources associated with particular SRS types for the transmission of one or more PUSCH communications. For example, the SRI field may indicate that the UE is to use SRS resources associated with periodic SRS transmissions, aperiodic SRS transmissions, and/or semi-persistent SRS transmissions. Accordingly, the UE may identify the SRS resources, that are to be used for the transmission of the one or more PUSCH communications, by identifying a most recent SRS transmission, of the specified one or more SRS types, to the scheduled transmission of the one or more PUSCH communications.

As further shown in FIG. 7, and by reference number 706, the UE may transmit the one or more PUSCH communications using the one or more SRS resources that were identified based at least in part on the configured grant. Thus, the UE may transmit the one or more PUSCH communications in the time-frequency resources corresponding to the one or more SRS resources. For example, the UE may use one SRS resource to transmit codebook-based PUSCH communications. As another example, the UE may use a plurality of SRS resources to transmit non-codebook-based PUSCH communications.

In this way, the BS may transmit a configured grant that may include an SRI field that indicates the UE is to use one or more SRS resources, associated with an SRS transmission that occurred most recently in time, relative to other SRS transmissions, prior to transmission of one or more PUSCH communications, and that occurred at least a quantity of symbols prior to the transmission of the one or more PUSCH communications, for the transmission of the one or more PUSCH communications. This permits the UE to identify SRS resources for transmitting one or more PUSCH communications that are scheduled via a configured grant, which the UE was not previously capable of performing.

As indicated above, FIG. 7 is provided as an example. Other examples may differ from what is described with respect to FIG. 7.

Figure 8:
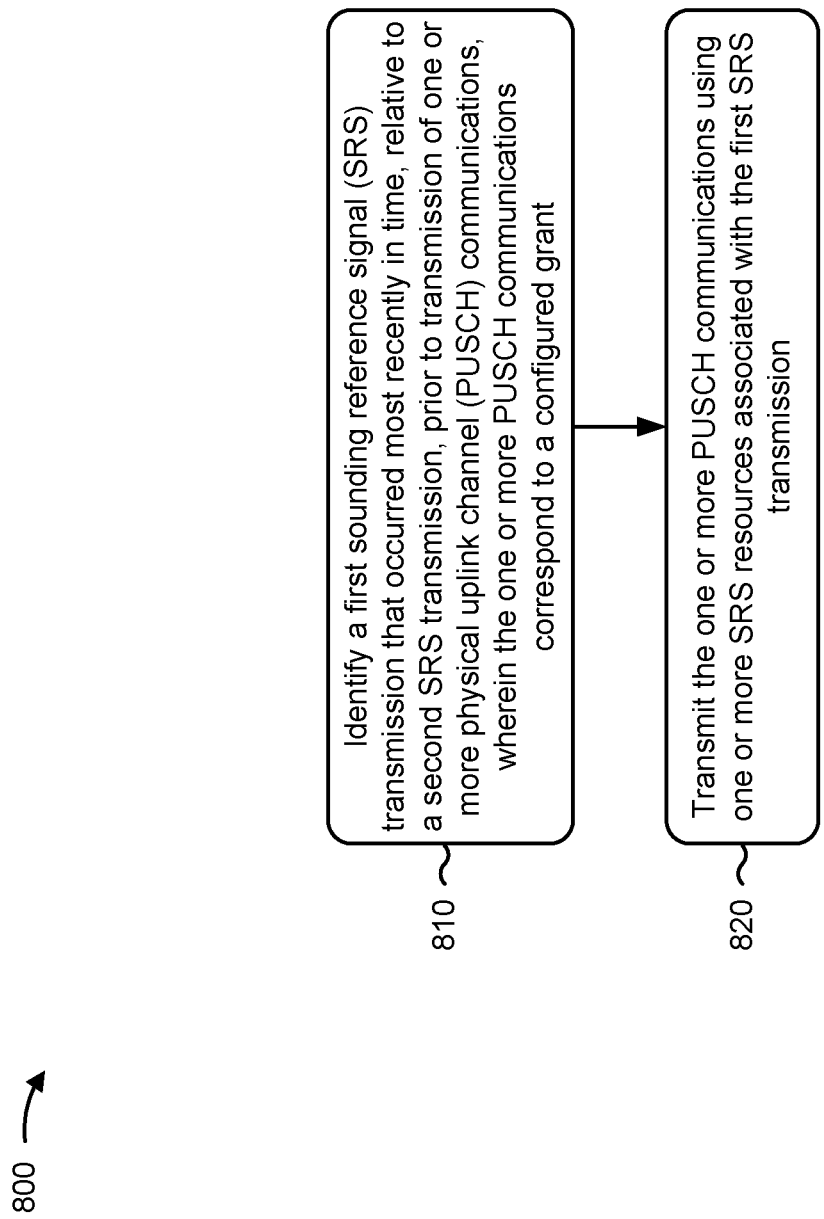
FIGS. 8-10 are diagrams illustrating example processes performed, for example, by a user equipment (UE), in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs operations associated with SRS resource determination for PUSCH with configured grant.

As shown in FIG. 8, in some aspects, process 800 may include identifying a first SRS transmission that occurred most recently in time, relative to a second SRS transmission, prior to transmission of one or more PUSCH communications, wherein the one or more PUSCH communications correspond to a configured grant (block 810). For example, the UE (e.g., using receive processor 258, transmit processor 264, controller/processor 280, memory 282, and/or the like) may identify a first SRS transmission that occurred most recently in time, relative to a second SRS transmission, prior to transmission of one or more PUSCH communications, as described above. In some aspects, the one or more PUSCH communications may correspond to a configured grant.

As further shown in FIG. 8, in some aspects, process 800 may include transmitting the one or more PUSCH communications using one or more SRS resources associated with the first SRS transmission (block 820). For example, the UE (e.g., using receive processor 258, transmit processor 264, controller/processor 280, memory 282, and/or the like) may transmit the one or more PUSCH communications using one or more SRS resources associated with the first SRS transmission, as described above.

Process 800 may include additional aspects, such as any single implementation or any combination of aspects described below and/or in connection with one or more other processes described elsewhere herein.

In a first aspect, the configured grant comprises a Type 1 configured grant, the Type 1 configured grant comprising an RRC configured and activated grant.

In a second aspect, alone or in combination with the first aspect, process 800 further comprises identifying the one or more SRS resources, associated with the first SRS transmission, based at least in part on an SRI field indicated by the RRC configured grant, and transmitting the one or more PUSCH communications using the one or more SRS resources comprises transmitting the one or more PUSCH communications using the one or more SRS resources based at least in part on identifying the one or more SRS resources.

In a third aspect, alone or in combination with one or more of the first or second aspects, identifying the first SRS transmission comprises identifying the first SRS transmission based at least in part on the first SRS transmission being a periodic SRS transmission. In a fourth aspect, alone or in combination with one or more of the first through third aspects, identifying the first SRS transmission comprises identifying the first SRS transmission based at least in part on the first SRS transmission being an aperiodic SRS transmission.

In a fifth aspect, alone or in combination with one or more of the first through fourth aspects, identifying the first SRS transmission comprises identifying the first SRS transmission based at least in part on the first SRS transmission being a semi-persistent SRS transmission. In a sixth aspect, alone or in combination with one or more of the first through fifth aspects, identifying the first SRS transmission comprises identifying the first SRS transmission based at least in part on the first SRS transmission being at least one of a periodic SRS transmission or a semi-persistent SRS transmission. In a seventh aspect, alone or in combination with one or more of the first through sixth aspects, identifying the first SRS transmission comprises identifying the first SRS transmission based at least in part on the first SRS transmission being at least one of a periodic SRS transmission, an aperiodic SRS transmission, or a semi-persistent SRS transmission.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
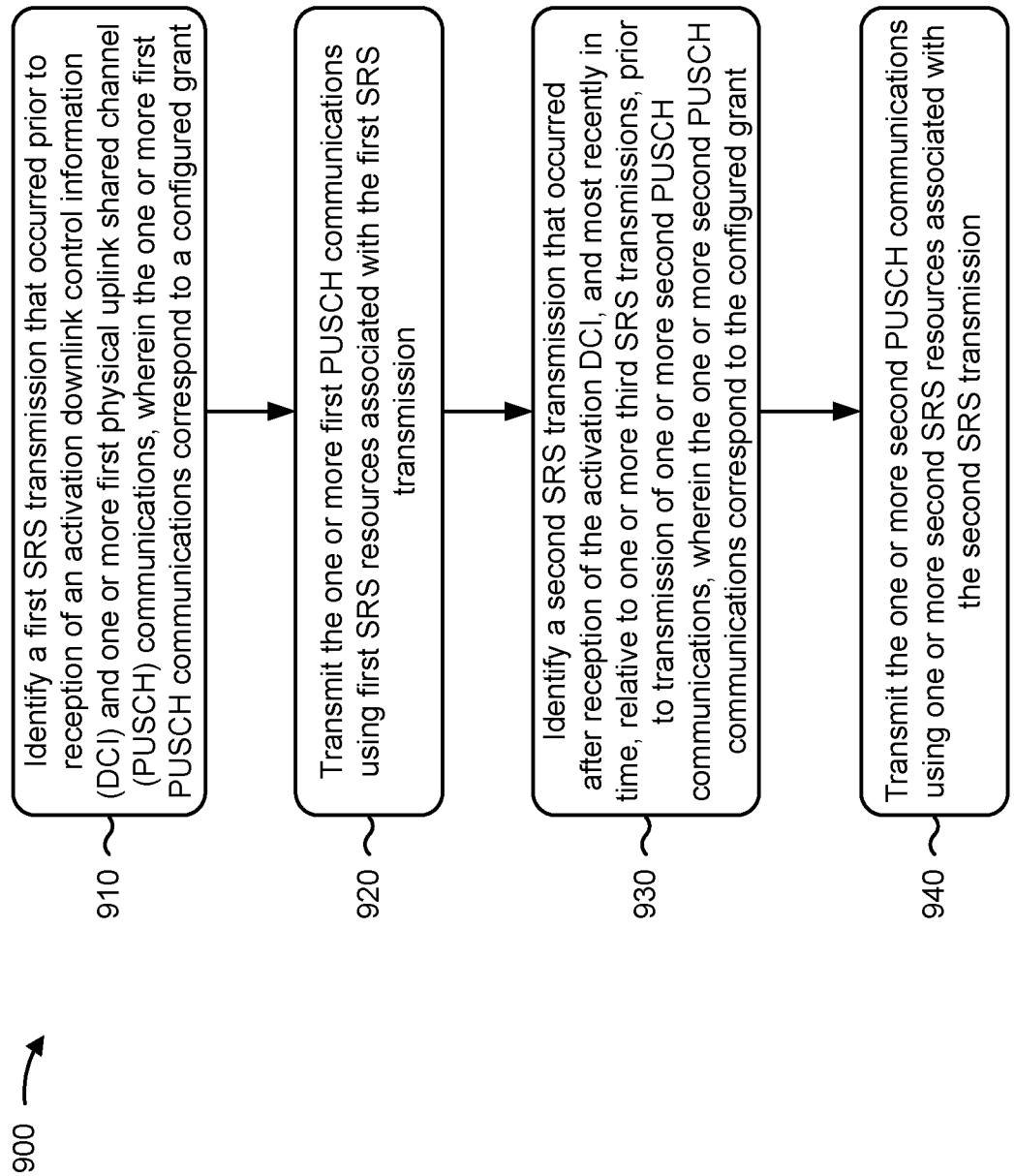

FIG. 9 is a diagram illustrating an example process 900 performed, for example, by a UE, in accordance with various aspects of the present disclosure. Example process 900 is an example where a UE (e.g., UE 120) performs operations associated with SRS resource determination for PUSCH with configured grant.

As shown in FIG. 9, in some aspects, process 900 may include identifying a first SRS transmission that occurred prior to reception of an activation DCI and transmission of one or more first PUSCH communications, wherein the one or more first PUSCH communications correspond to a configured grant (block 910). For example, the UE (e.g., using receive processor 258, transmit processor 264, controller/processor 280, memory 282, and/or the like) may identify a first SRS transmission that occurred prior to reception of an activation DCI and transmission of one or more first PUSCH communications, as described above. In some aspects, the one or more first PUSCH communications correspond to a configured grant.

As further shown in FIG. 9, in some aspects, process 900 may include transmitting the one or more first PUSCH communications using one or more first SRS resources associated with the first SRS transmission (block 920). For example, the UE (e.g., using receive processor 258, transmit processor 264, controller/processor 280, memory 282, and/or the like) may transmit the one or more first PUSCH communications using one or more first SRS resources associated with the first SRS transmission, as described above.

As further shown in FIG. 9, in some aspects, process 900 may include identifying a second SRS transmission that occurred after reception of the activation DCI and most recently in time, relative to one or more third SRS transmissions, prior to transmission of one or more second PUSCH communications, wherein the one or more second PUSCH communications correspond to the configured grant (block 930). For example, the UE (e.g., using receive processor 258, transmit processor 264, controller/processor 280, memory 282, and/or the like) may identify a second SRS transmission that occurred after reception of the activation DCI and most recently in time, relative to one or more third SRS transmissions, prior to transmission of one or more second PUSCH communications, as described above. In some aspects, the one or more second PUSCH communications correspond to the configured grant.

As further shown in FIG. 9, in some aspects, process 900 may include transmitting the one or more second PUSCH communications using one or more second SRS resources associated with the second SRS transmission (block 940). For example, the UE (e.g., using receive processor 258, transmit processor 264, controller/processor 280, memory 282, and/or the like) may transmit the one or more second PUSCH communications using one or more second SRS resources associated with the second SRS transmission, as described above.

Process 900 may include additional aspects, such as any single implementation or any combination of aspects described below and/or in connection with one or more other processes described elsewhere herein.

In a first aspect, the configured grant comprises a Type 2 configured grant, and the Type 2 configured grant comprises an RRC configured grant that is activated by the activation DCI. In a second aspect, alone or in combination with the first aspect, process 900 further comprises identifying the one or more first SRS resources, associated with the first SRS transmission, based at least in part on an SRI field indicated by the activation DCI, and transmitting the one or more first PUSCH communications using the one or more first SRS resources comprises transmitting the one or more first PUSCH communications, using the one or more first SRS resources, based at least in part on identifying the one or more first SRS resources.

In a third aspect, alone or in combination with one or more of the first or second aspects, process 900 further comprises identifying the one or more second SRS resources, associated with the second SRS transmission, based at least in part on an SRI field indicated by the activation DCI, and transmitting the one or more second PUSCH communications using the one or more second SRS resources comprises transmitting the one or more second PUSCH communications, using the one or more second SRS resources, based at least in part on identifying the one or more second SRS resources.

In a fourth aspect, alone or in combination with one or more of the first through third aspects, identifying the first SRS transmission comprises identifying the first SRS transmission based at least in part on the first SRS transmission being a periodic SRS transmission. In a fifth aspect, alone or in combination with one or more of the first through fourth aspects, identifying the second SRS transmission comprises identifying the second SRS transmission based at least in part on the second SRS transmission being a periodic SRS transmission.

In a sixth aspect, alone or in combination with one or more of the first through fifth aspects, identifying the first SRS transmission comprises identifying the first SRS transmission based at least in part on the first SRS transmission being an aperiodic SRS transmission. In a seventh aspect, alone or in combination with one or more of the first through sixth aspects, identifying the second SRS transmission comprises identifying the second SRS transmission based at least in part on the second SRS transmission being an aperiodic SRS transmission.

In an eighth aspect, alone or in combination with one or more of the first through seventh aspects, identifying the first SRS transmission comprises identifying the first SRS transmission based at least in part on the first SRS transmission being a semi-persistent SRS transmission. In a ninth aspect, alone or in combination with one or more of the first through eighth aspects, identifying the second SRS transmission comprises identifying the second SRS transmission based at least in part on the second SRS transmission being a semi-persistent SRS transmission.

In a tenth aspect, alone or in combination with one or more of the first through ninth aspects, identifying the first SRS transmission comprises identifying the first SRS transmission based at least in part on the first SRS transmission being at least one of a periodic SRS transmission or a semi-persistent SRS transmission. In an eleventh aspect, alone or in combination with one or more of the first through tenth aspects, identifying the second SRS transmission comprises identifying the second SRS transmission based at least in part on the second SRS transmission being at least one of a periodic SRS transmission or a semi-persistent SRS transmission.

In a twelfth aspect, alone or in combination with one or more of the first through eleventh aspects, identifying the first SRS transmission comprises identifying the first SRS transmission based at least in part on the first SRS transmission being at least one of a periodic SRS transmission, an aperiodic SRS transmission, or a semi-persistent SRS transmission. In a thirteenth aspect, alone or in combination with one or more of the first through twelfth aspects, identifying the second SRS transmission comprises identifying the second SRS transmission based at least in part on the second SRS transmission being at least one of a periodic SRS transmission, an aperiodic SRS transmission, or a semi-persistent SRS transmission.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
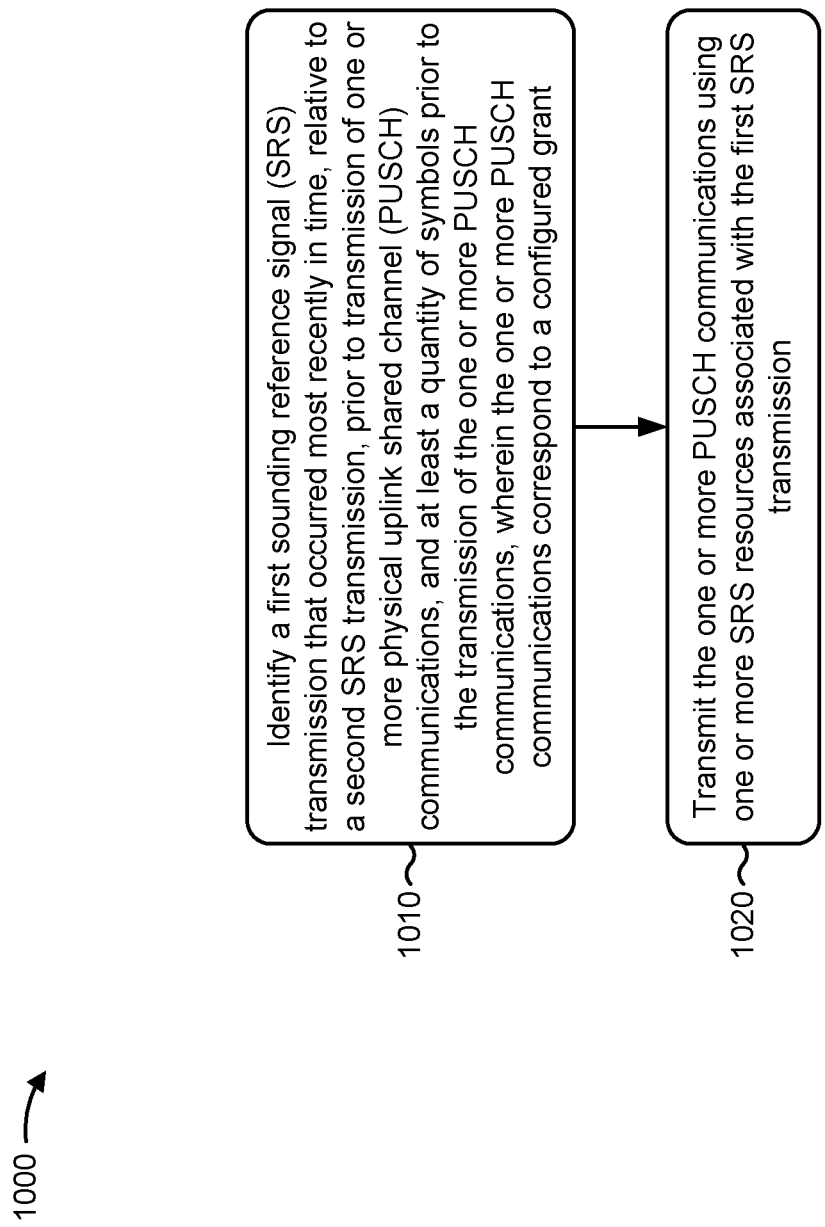

FIG. 10 is a diagram illustrating an example process 1000 performed, for example, by a UE, in accordance with various aspects of the present disclosure. Example process 1000 is an example where a UE (e.g., UE 120) performs operations associated with SRS resource determination for PUSCH with configured grant.

As shown in FIG. 10, in some aspects, process 1000 may include identifying a first SRS transmission that occurred most recently in time, relative to a second SRS transmission, prior to transmission of one or more PUSCH communications, and at least a quantity of symbols prior to the transmission of the one or more PUSCH communications, wherein the one or more PUSCH communications correspond to a configured grant (block 1010). For example, the UE (e.g., using receive processor 258, transmit processor 264, controller/processor 280, memory 282, and/or the like) may identify a first SRS transmission that occurred most recently in time, relative to a second SRS transmission, prior to transmission of one or more PUSCH communications, and at least a quantity of symbols prior to the transmission of the one or more PUSCH communications, as described above. In some aspects, the one or more PUSCH communications correspond to a configured grant.

As further shown in FIG. 10, in some aspects, process 1000 may include transmitting the one or more PUSCH communications using one or more SRS resources associated with the first SRS transmission (block 1020). For example, the UE (e.g., using receive processor 258, transmit processor 264, controller/processor 280, memory 282, and/or the like) may transmit the one or more PUSCH communications using one or more SRS resources associated with the first SRS transmission, as described above.

Process 1000 may include additional aspects, such as any single implementation or any combination of aspects described below and/or in connection with one or more other processes described elsewhere herein.

In a first aspect, the configured grant comprises a Type 1 configured grant, the Type 1 configured grant comprising an RRC configured and activated grant. In a second aspect, alone or in combination with the first aspect, the configured grant comprises a Type 2 configured grant, the Type 2 configured grant comprising an RRC configured grant that is activated by an activation DCI. In a third aspect, alone or in combination with one or more of the first or second aspects, process 1000 further comprises identifying the one or more SRS resources based at least in part on an SRI field, and transmitting the one or more PUSCH communications using the one or more SRS resources comprises transmitting the one or more PUSCH communications using the one or more SRS resources based at least in part on identifying the one or more SRS resources.

In a fourth aspect, alone or in combination with one or more of the first through third aspects, identifying the first SRS transmission comprises identifying the first SRS transmission based at least in part on the first SRS transmission being a periodic SRS transmission. In a fifth aspect, alone or in combination with one or more of the first through fourth aspects, identifying the first SRS transmission comprises identifying the first SRS transmission based at least in part on the first SRS transmission being an aperiodic SRS transmission.

In a sixth aspect, alone or in combination with one or more of the first through fifth aspects, identifying the first SRS transmission comprises identifying the first SRS transmission based at least in part on the first SRS transmission being a semi-persistent SRS transmission. In a seventh aspect, alone or in combination with one or more of the first through sixth aspects, identifying the first SRS transmission comprises identifying the first SRS transmission based at least in part on the first SRS transmission being at least one of a periodic SRS transmission or a semi-persistent SRS transmission.

In an eighth aspect, alone or in combination with one or more of the first through seventh aspects, identifying the first SRS transmission comprises identifying the first SRS transmission based at least in part on the first SRS transmission being at least one of a periodic SRS transmission, an aperiodic SRS transmission, or a semi-persistent SRS transmission.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    identifying a first sounding reference signal (SRS) transmission, corresponding to a first set of uplink time-frequency resources, that occurred most recently in time, relative to a second SRS transmission, wherein the first SRS transmission is prior to transmission of one or more physical uplink shared channel (PUSCH) communications,
        wherein the one or more PUSCH communications correspond to a configured grant; and
    transmitting the one or more PUSCH communications using one or more SRS resources associated with the first SRS transmission, based at least in part on the configured grant being a Type 1 configured grant, wherein the one or more SRS resources comprise the first set of uplink time-frequency resources.

2. The method of claim 1,
    wherein the Type 1 configured grant comprises:
        a radio resource control (RRC) configured and activated grant.

3. The method of claim 2, further comprising:
    identifying the one or more SRS resources, associated with the first SRS transmission, based at least in part on an SRS resource indicator (SRI) field indicated by the RRC configured and activated grant; and
    wherein transmitting the one or more PUSCH communications using the one or more SRS resources comprises:
        transmitting the one or more PUSCH communications using the one or more SRS resources based at least in part on identifying the one or more SRS resources.

4. The method of claim 3, wherein the Type 1 configured grant comprises the SRI field.

5. The method of claim 1, wherein identifying the first SRS transmission comprises:
    identifying the first SRS transmission based at least in part on the first SRS transmission being a periodic SRS transmission.

6. The method of claim 1, wherein identifying the first SRS transmission comprises:
    identifying the first SRS transmission based at least in part on the first SRS transmission being at least one of:
        a periodic SRS transmission, or
        a semi-persistent SRS transmission.

7. The method of claim 1, wherein identifying the first SRS transmission comprises:
    identifying the first SRS transmission based at least in part on the first SRS transmission being at least one of:
        a periodic SRS transmission,
        an aperiodic SRS transmission, or
        a semi-persistent SRS transmission.

8. A method of wireless communication performed by a user equipment (UE), comprising:
    identifying a first sounding reference signal (SRS) transmission, corresponding to a first set of uplink time-frequency resources, that occurred:
        most recently in time, relative to a second SRS transmission, and prior to transmission of one or more physical uplink shared channel (PUSCH) communications, and at least a quantity of symbols, associated with a processing time, prior to the transmission of the one or more PUSCH communications,
wherein the first SRS transmission corresponds to the first set of uplink time-frequency resources, and
wherein the one or more PUSCH communications correspond to a configured grant; and
transmitting the one or more PUSCH communications using one or more SRS resources associated with the first SRS transmission, prior to the one or more PUSCH communications, based at least in part on a type of the configured grant, wherein the one or more SRS resources comprise the first set of uplink time-frequency resources.

9. The method of claim 8, wherein the type of the configured grant comprises:
a Type 1 configured grant,
wherein the Type 1 configured grant comprises:
a radio resource control (RRC) configured and activated grant.

10. The method of claim 9, wherein the Type 1 configured grant comprises an SRS resource indicator (SRI) field.

11. The method of claim 8, wherein the type of the configured grant comprises:
a Type 2 configured grant,
wherein the Type 2 configured grant comprises:
a radio resource control (RRC) configured grant that is activated by an activation downlink control information (DCI).

12. The method of claim 8, further comprising:
identifying the one or more SRS resources based at least in part on an SRS resource indicator (SRI) field; and
wherein transmitting the one or more PUSCH communications using the one or more SRS resources comprises:
transmitting the one or more PUSCH communications using the one or more SRS resources based at least in part on identifying the one or more SRS resources.

13. The method of claim 8, wherein identifying the first SRS transmission comprises:
identifying the first SRS transmission based at least in part on the first SRS transmission being a periodic SRS transmission.

14. The method of claim 8, wherein identifying the first SRS transmission comprises:
identifying the first SRS transmission based at least in part on the first SRS transmission being at least one of:
a periodic SRS transmission,
an aperiodic SRS transmission, or
a semi-persistent SRS transmission.

15. A user equipment (UE) for wireless communication, comprising:
one or more memories; and
one or more processors coupled to the one or more memories, the one or more processors individually or collectively configured to:
identify a first sounding reference signal (SRS) transmission, corresponding to a first set of uplink time-frequency resources, that occurred most recently in time, relative to a second SRS transmission, wherein the first SRS transmission is prior to transmission of one or more physical uplink shared channel (PUSCH) communications,
wherein the one or more PUSCH communications correspond to a configured grant; and
transmit the one or more PUSCH communications using one or more SRS resources associated with the first SRS transmission, based at least in part on the configured grant being a Type 1 configured grant, wherein the one or more SRS resources comprise the first set of uplink time-frequency resources.

16. The UE of claim 15
wherein the Type 1 configured grant comprises:
a radio resource control (RRC) configured and activated grant.

17. The UE of claim 16, wherein the one or more processors are further configured to:
identify the one or more SRS resources, associated with the first SRS transmission, based at least in part on an SRS resource indicator (SRI) field indicated by the RRC configured and activated grant; and
wherein the one or more processors, to transmit the one or more PUSCH communications using the one or more SRS resources, are configured to:
transmit the one or more PUSCH communications using the one or more SRS resources based at least in part on identifying the one or more SRS resources.

18. The UE of claim 15, wherein the one or more processors, to identify the first SRS transmission, are configured to:
identify the first SRS transmission based at least in part on the first SRS transmission being a periodic SRS transmission.

19. The UE of claim 15, wherein the one or more processors, to identify the first SRS transmission, are configured to:
identify the first SRS transmission based at least in part on the first SRS transmission being at least one of:
a periodic SRS transmission,
an aperiodic SRS transmission, or
a semi-persistent SRS transmission.

20. A user equipment (UE) for wireless communication, comprising:
one or more memories; and
one or more processors coupled to the one or more memories, the one or more processors individually or collectively configured to:
identify a first sounding reference signal (SRS) transmission, corresponding to a first set of uplink time-frequency resources, that occurred:
most recently in time, relative to a second SRS transmission, and prior to transmission of one or more physical uplink shared channel (PUSCH) communications, and
at least a quantity of symbols, associated with a processing time, prior to the transmission of the one or more PUSCH communications,
wherein the first SRS transmission corresponds to the first set of uplink time-frequency resources, and
wherein the one or more PUSCH communications correspond to a configured grant; and
transmit the one or more PUSCH communications using one or more SRS resources associated with the first SRS transmission, prior to the one or more PUSCH communications, based at least in part on a type of the configured grant, wherein the one or more SRS resources comprise the first set of uplink time-frequency resources.

21. The UE of claim 20, wherein the type of the configured grant comprises:
   a Type 1 configured grant,
      wherein the Type 1 configured grant comprises:
         a radio resource control (RRC) configured and activated grant.

22. The UE of claim 20, wherein the type of the configured grant comprises:
   a Type 2 configured grant,
      wherein the Type 2 configured grant comprises:
         a radio resource control (RRC) configured grant that is activated by an activation downlink control information (DCI).

23. The UE of claim 20, wherein the one or more processors are further configured to:
   identify the one or more SRS resources based at least in part on an SRS resource indicator (SRI) field; and
   wherein the one or more processors, to transmit the one or more PUSCH communications using the one or more SRS resources, are configured to:
      transmit the one or more PUSCH communications using the one or more SRS resources based at least in part on identifying the one or more SRS resources.

24. The UE of claim 20, wherein the one or more processors, to identify the first SRS transmission, are configured to:
   identify the first SRS transmission based at least in part on the first SRS transmission being a periodic SRS transmission.

25. The UE of claim 20, wherein the one or more processors, to identify the first SRS transmission, are configured to:
   identify the first SRS transmission based at least in part on the first SRS transmission being at least one of:
      a periodic SRS transmission, or
      a semi-persistent SRS transmission.

26. The UE of claim 20, wherein the one or more processors, to identify the first SRS transmission, are configured to:
   identify the first SRS transmission based at least in part on the first SRS transmission being at least one of:
      a periodic SRS transmission,
      an aperiodic SRS transmission, or
      a semi-persistent SRS transmission.

\* \* \* \* \*